US012650357B2

(12) United States Patent
Shen et al.

(10) Patent No.: US 12,650,357 B2
(45) Date of Patent: Jun. 9, 2026

(54) METHOD FOR DETECTING LEAKAGE OF FULL-CAPACITY LNG STORAGE TANK BY ACOUSTIC EMISSION

(71) Applicant: China Special Equipment Inspection and Research Institute, Beijing (CN)

(72) Inventors: Yongna Shen, Beijing (CN); Gongtian Shen, Beijing (CN); Bin Hu, Beijing (CN); Junjiao Zhang, Beijing (CN); Yufeng Ouyang, Beijing (CN); Mengjun Li, Beijing (CN)

(73) Assignee: CHINA SPECIAL EQUIPMENT INSPECTION AND RESEARCH INSTITUTE, Beijing (CN)

( * ) Notice: Subject to any disclaimer, the term of this patent is extended or adjusted under 35 U.S.C. 154(b) by 354 days.

(21) Appl. No.: 18/401,535

(22) Filed: Dec. 31, 2023

(65) Prior Publication Data

US 2024/0337553 A1 Oct. 10, 2024

(30) Foreign Application Priority Data

Apr. 6, 2023 (CN) ........................ 202310362192.X

(51) Int. Cl.
G01M 3/24 (2006.01)
F17C 13/02 (2006.01)
F17C 13/12 (2006.01)

(52) U.S. Cl.
CPC ............... *G01M 3/24* (2013.01); *F17C 13/02* (2013.01); *F17C 13/126* (2013.01);
(Continued)

(58) Field of Classification Search
CPC . G01M 3/24; G01M 3/32; F17C 13/02; F17C 13/126; F17C 2221/033; F17C 2250/0465; F17C 2250/0486; F17C 2260/044; G06F 18/24; G01N 29/14; G01N 29/225; G01N 29/041; G01N 27/83;
(Continued)

(56) References Cited

U.S. PATENT DOCUMENTS

| | | | | |
|---|---|---|---|---|
| 4,462,249 A | * | 7/1984 | Adams | B67D 7/3209 73/592 |
| 2014/0076449 A1 | * | 3/2014 | Betsinger | G01M 5/0033 138/104 |
| 2022/0034849 A1 | * | 2/2022 | Nashed | G01M 13/005 |

FOREIGN PATENT DOCUMENTS

CN 206161053 U * 5/2017

* cited by examiner

*Primary Examiner* — Brandi N Hopkins
(74) *Attorney, Agent, or Firm* — Gallium Law; Jacob Panangat

(57) ABSTRACT

Disclosed is a method for detecting leakage of a full-capacity liquefied natural gas (LNG) storage tank by acoustic emission. The method includes: detecting an amplitude of system noise by an acoustic sensor, and determining a signal acquisition threshold; acquiring an amplitude of ambient noise; acquiring an amplitude of the acoustic signal excited by the analog sound source at the distance of 0.1 m from the acoustic sensor and an amplitude of the acoustic signal excited by the analog sound source at the distance of x m from the acoustic sensor, and calculating, an attenuation coefficient of an acoustic signal passing through the outer wall of the storage tank; determining a maximum detection range of the acoustic sensor; and continuously moving the acoustic sensor on the outer wall of the storage tank in a step smaller than the maximum detection range, to perform an LNG leakage detection.

8 Claims, 2 Drawing Sheets

(52) U.S. Cl.
CPC .................. *F17C 2221/033* (2013.01); *F17C 2250/0465* (2013.01); *F17C 2250/0486* (2013.01); *F17C 2260/044* (2013.01)

(58) Field of Classification Search
CPC .... G01N 29/04; G01N 29/0672; G01N 29/11; G01N 29/045; G01N 29/4454; F17D 5/005; F17D 5/06; G01S 5/22; G01H 17/00; G01F 23/0007; G01B 17/02
USPC ........................................................ 73/49.2
See application file for complete search history.

METHOD FOR DETECTING LEAKAGE OF FULL-CAPACITY LNG STORAGE TANK BY ACOUSTIC EMISSION

CROSS REFERENCE TO RELATED APPLICATION

This patent application claims the benefit and priority of Chinese Patent Application No. 202310362192.X, filed with the China National Intellectual Property Administration on Apr. 6, 2023, the disclosure of which is incorporated by reference herein in its entirety as part of the present application.

TECHNICAL FIELD

The present disclosure relates to the field of leakage detection technologies, and in particular to a method for detecting leakage of a full-capacity liquefied natural gas (LNG) storage tank by acoustic emission.

BACKGROUND

With the improvement of energy strategies, construction of infrastructure for liquefied natural gas (LNG) is vigorously promoted worldwide. A super-large full-capacity storage tank used on pre-stressed concrete ground plays a leading role because of good economy, safety, and applicability thereof.

A wall of the full-capacity LNG storage tank includes an outer tank made of reinforced concrete, an inner tank made of a low-temperature steel plate, and an elastic glass felt and expanded perlite that are filled between the outer tank and the inner tank and used for cold insulation. A steel lining plate is disposed on an inner side of the outer tank, and the steel lining plate is welded to a metal member (for example, a pre-embedded member) pre-embedded in a wall of the outer tank. The steel lining plate, a steel lining plate disposed on an inner side of a bottom of the outer tank, and a steel lining plate disposed on an inner side of a top of the outer tank form closed airtight space, and the closed airtight space is used to accommodate gas leakage of the inner tank. Therefore, once the steel lining plate has a penetrating defect, LNG gas inside the tank diffuses to a concrete outer wall (the outer wall). As a result, gas leaks from the tank, leading to accidents such as an explosion.

At present, a full-capacity LNG storage tank built in China mainly monitors LNG leakage of a tank by a thermocouple, a combustible gas detector, and a flame ionization detector. However, detection accuracy is low, and it is difficult to determine a position of a leakage point. Therefore, guarantee is poor.

SUMMARY

An objective of the present disclosure is to provide a method for detecting leakage of a full-capacity LNG storage tank by acoustic emission, to implement high-precision non-destructive testing of LNG leakage.

To achieve the foregoing objective, the present disclosure provides the following technical solutions.

A method for detecting leakage of a full-capacity LNG storage tank by acoustic emission includes:

suspending a detection surface of an acoustic sensor, detecting an amplitude of system noise by an acoustic emission machine connected to the acoustic sensor, and detecting a signal acquisition threshold;

mounting the acoustic sensor on an outer side of an outer wall of a storage tank, and acquiring an amplitude of ambient noise based on the signal acquisition threshold;

exciting an acoustic signal at a distance of 0.1 m and a distance of x m from the acoustic sensor by an analog sound source, and acquiring, by the acoustic sensor, an amplitude of the acoustic signal excited by the analog sound source at the distance of 0.1 m from the acoustic sensor and an amplitude of the acoustic signal excited by the analog sound source at the distance of x m from the acoustic sensor, where x represents a thickness of the outer wall of the storage tank, in m;

calculating, based on the amplitude of the acoustic signal excited by the analog sound source at the distance of 0.1 m from the acoustic sensor and the amplitude of the acoustic signal excited by the analog sound source at the distance of x m from the acoustic sensor, an attenuation coefficient of an acoustic signal passing through the outer wall of the storage tank;

determining a maximum detection range of the acoustic sensor based on the amplitude of the ambient noise and the attenuation coefficient; and continuously moving the acoustic sensor on the outer wall of the storage tank in a step smaller than the maximum detection range, to perform an LNG leakage detection.

Optionally, the suspending a detection surface of an acoustic sensor, detecting an amplitude of system noise by an acoustic emission machine connected to the acoustic sensor, and detecting a signal acquisition threshold specifically includes:

suspending the detection surface of the acoustic sensor, acquiring an acoustic signal by the acoustic emission machine connected to the acoustic sensor, and recording a maximum amplitude of the acquired acoustic signal as an amplitude of system noise $m_1$ dB; and setting the signal acquisition threshold to $k_1 = m_1 + 1$ dB.

Optionally, the mounting the acoustic sensor on an outer side of an outer wall of a storage tank, and acquiring an amplitude of ambient noise based on the signal acquisition threshold specifically includes:

mounting the acoustic sensor on the outer side of the outer wall of the storage tank, acquiring acoustic signals at least four different positions, and acquiring only an acoustic signal with an amplitude larger than $k_1$; and comparing strengths of the acoustic signals at the positions, and recording a maximum amplitude of an acoustic signal with a same distribution range as the amplitude $m_2$ dB of the ambient noise.

Optionally, the calculating, based on the amplitude of the acoustic signal excited by the analog sound source at the distance of 0.1 m from the acoustic sensor and the amplitude of the acoustic signal excited by the analog sound source at the distance of x m from the acoustic sensor, an attenuation coefficient of an acoustic signal passing through the outer wall of the storage tank specifically includes:

calculating, based on an amplitude $m_3$ of the acoustic signal excited by the analog sound source at the distance of 0.1 m from the acoustic sensor and an amplitude $m_4$ of the acoustic signal excited by the analog sound source at the distance of x m from the acoustic sensor, an attenuation coefficient $\alpha$ of an acoustic signal passing through the outer wall of the storage tank according to a formula $\alpha = (m_3 - m_4)/(x - 0.1)$.

Optionally, the determining a maximum detection range of the acoustic sensor based on the amplitude of the ambient noise and the attenuation coefficient specifically includes:

determining a maximum detection range L of the acoustic sensor based on an amplitude $m_2$ of the ambient noise and the attenuation coefficient $\alpha$ according to a formula $L=(m_{max}-m_2)/\alpha$, where $m_{max}$ represents a maximum amplitude of an acoustic signal of leakage of a lining plate of the storage tank.

Optionally, the continuously moving the acoustic sensor on the outer wall of the storage tank in a step smaller than the maximum detection range, to perform an LNG leakage detection specifically includes:

placing the acoustic sensor at a radial position the same as a pre-embedded member in the storage tank, continuously moving the acoustic sensor on the outer wall of the storage tank in a step less than L, and acquiring an acoustic signal at each step position within a preset period of time; and determining a step position at which a largest quantity of acoustic signals are acquired per unit time and a strength of the acoustic signal is strongest as an LNG leakage position.

Optionally, the acoustic sensor is a piezoelectric acoustic sensor or a fiber-optic acoustic sensor.

Optionally, the analog sound source is a lead-break signal or a signal excited by an acoustic emission sensor.

According to specific embodiments provided in the present disclosure, the present disclosure has the following technical effect:

According to the method for detecting leakage of a full-capacity LNG storage tank by acoustic emission provided in the present disclosure, first, the amplitude of the system noise and the amplitude of the ambient noise are detected by the acoustic sensor; the amplitude of the acoustic signal excited by the analog sound source at the distance of 0.1 m from the acoustic sensor and the amplitude of the acoustic signal excited by the analog sound source at the distance of x m from the acoustic sensor are acquired by the acoustic sensor, and the attenuation coefficient of an acoustic signal passing through the outer wall of the storage tank is calculated; the maximum detection range of the acoustic sensor is determined based on the amplitude of the ambient noise and the attenuation coefficient; and the acoustic sensor continuously moves on the outer wall of the storage tank in a step smaller than the maximum detection range, to perform an LNG leakage detection. The method of the present disclosure can implement high-precision non-destructive testing of the LNG leakage without opening the tank or stopping the machine.

BRIEF DESCRIPTION OF THE DRAWINGS

To describe the technical solutions in embodiments of the present disclosure or in the prior art more clearly, the accompanying drawings required for the embodiments are briefly described below. Apparently, the accompanying drawings in the following description show merely some embodiments of the present disclosure, and those of ordinary skill in the art may still derive other accompanying drawings from these accompanying drawings without creative efforts.

DETAILED DESCRIPTION OF THE EMBODIMENTS

The technical solutions of the embodiments of the present disclosure are clearly and completely described below with reference to the drawings in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

An objective of the present disclosure is to provide a method for detecting leakage of a full-capacity LNG storage tank by acoustic emission, to perform high-precision non-destructive testing of LNG leakage.

When a lining plate of the LNG storage tank has a defect, for example, a penetrating crack or a hole, an LNG gas flows outward and leaks, and even flows outward with filling materials such as perlite of an insulation layer during the leakage. When the LNG gas is ejected outward through the crack or the defect, an acoustic emission source is formed, and the acoustic signal (referred to as acoustic signal) sent by the acoustic emission source passes through the lining plate and concrete, and propagates to an outer side of a concrete outer wall. This causes a displacement. Therefore, in the present disclosure, a suitable piezoelectric acoustic sensor or a fiber-optic acoustic sensor is used to sweep an outer side of an outer wall of the LNG storage tank, and a characteristic of the acquired acoustic signal is analyzed, to detect leakage of the storage tank and determine a position of a leakage point.

To make the foregoing objective, features and advantages of the present disclosure clearer and more comprehensible, the present disclosure will be further described in detail below in combination with accompanying drawings and particular implementation modes.

Figure 1:
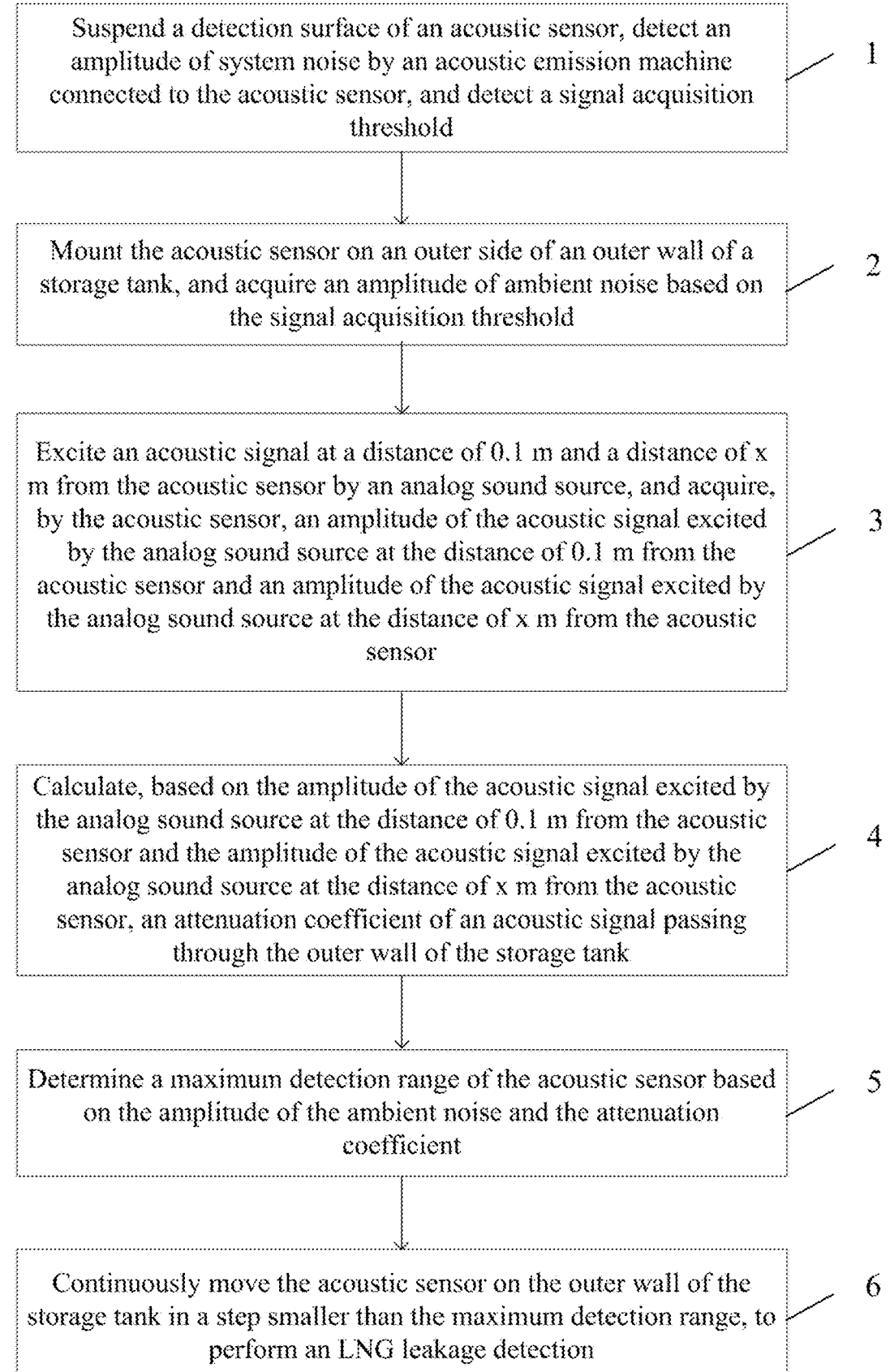
FIG. 1 is a flowchart of a method for detecting leakage of a full-capacity LNG storage tank by acoustic emission according to the present disclosure.

FIG. 1 is a flowchart of a method for detecting leakage of a full-capacity LNG storage tank by acoustic emission according to the present disclosure. As shown in FIG. 1, the flowchart of a method for detecting leakage of a full-capacity LNG storage tank by acoustic emission includes the followings steps.

Step 1: Suspend a detection surface of an acoustic sensor, detecting an amplitude of system noise by an acoustic emission machine connected to the acoustic sensor, and detect a signal acquisition threshold.

As a specific embodiment, the acoustic sensor may be a piezoelectric acoustic sensor or a fiber-optic acoustic sensor.

The acoustic sensor is connected to the acoustic emission machine, the acoustic signal is detected by the acoustic sensor, and the acoustic signal is acquired and analyzed by the acoustic emission machine. The detection surface of the acoustic sensor is suspended, an acoustic signal is acquired by the acoustic emission machine connected to the acoustic sensor, and a maximum amplitude of the acquired acoustic signal is recorded as an amplitude of system noise $m_1$ dB. In this case, the signal acquisition threshold is set to $k_1=m_1+1$ dB.

Step 2: Mount the acoustic sensor on an outer side of an outer wall of a storage tank, and acquire an amplitude of ambient noise based on the signal acquisition threshold.

Specifically, the acoustic sensor is mounted on the outer side of the outer wall of the storage tank, acoustic signals at least four different positions are acquired, and only an acoustic signal with an amplitude larger than $k_1$ is acquired. If the acoustic sensor used does not acquire the acoustic signal with an amplitude larger than $k_1$, the acoustic sensor is replaced with an acoustic sensor with a lower frequency until the amplitude of the ambient noise is not less than $k_1$.

Strengths of the acoustic signals at the positions are compared. If there is no leakage at the detected position of the storage tank, distribution ranges of the acoustic signals at the positions are the same. In this case, a maximum amplitude of an acoustic signal with a same distribution range is recorded as an amplitude $m_2$ dB of the ambient noise. In addition, to prevent the acoustic signal from being not acquired because of low acquisition accuracy of the acoustic sensor, the signal acquisition threshold is adjusted to $k_2=m_2-n$ dB, n=1-4, $k_2 \geq k_1$. This ensures that an amplitude of an acoustic signal acquired in a subsequent step is greater than $k_2$.

Step 3: Excite an acoustic signal at a distance of 0.1 m and a distance of x m from the acoustic sensor by an analog sound source, and acquire, by the acoustic sensor, an amplitude of the acoustic signal excited by the analog sound source at the distance of 0.1 m from the acoustic sensor and an amplitude of the acoustic signal excited by the analog sound source at the distance of x m from the acoustic sensor, where x represents a thickness of the outer wall of the storage tank, in m.

Step 4: Calculate, based on the amplitude of the acoustic signal excited by the analog sound source at the distance of 0.1 m from the acoustic sensor and the amplitude of the acoustic signal excited by the analog sound source at the distance of x m from the acoustic sensor, an attenuation coefficient of an acoustic signal passing through the outer wall of the storage tank.

As a specific embodiment, a lead-break signal or another signal source (for example, a signal excited by the acoustic emission sensor) is used as an analog acoustic source to generate an acoustic signal, and the acoustic sensor is used to acquire the acoustic signal.

When the analog sound source is at the distance of 0.1 m from the acoustic sensor, the amplitude of the acoustic signal acquired by the acoustic sensor is $m_3$ dB, and when the analog sound source is at the distance of x m from the acoustic sensor, the amplitude of the acoustic signal acquired by the acoustic sensor is $m_4$ dB. The attenuation coefficient of the acoustic signal passing through the outer wall of the storage tank is calculated according to a formula $\alpha=(m_3-m_4)/(x-0.1)$.

Step 5: Determine a maximum detection range of the acoustic sensor based on the amplitude of the ambient noise and the attenuation coefficient.

As a specific embodiment, a maximum detection range L of the acoustic sensor is determined according to the formula $L=(m_{max}-m_2)/a$ based on the amplitude $m_2$ of the ambient noise and the attenuation coefficient $\alpha$, where $m_{max}$ represents a maximum amplitude of the acoustic signal of the leakage of the lining plate of the storage tank.

Step 6: Continuously move the acoustic sensor on the outer wall of the storage tank in a step smaller than the maximum detection range, to perform an LNG leakage detection.

As a specific embodiment, because an acoustic signal generated by the lining plate is transmitted to the outer side of the outer wall of the storage tank by a pre-embedded member, the acoustic sensor is placed at the radial position the same as the pre-embedded member inside the storage tank, to enable a transmission distance of the acoustic signal to be shortest. This reduces attenuation caused by a propagation distance.

Figure 2:
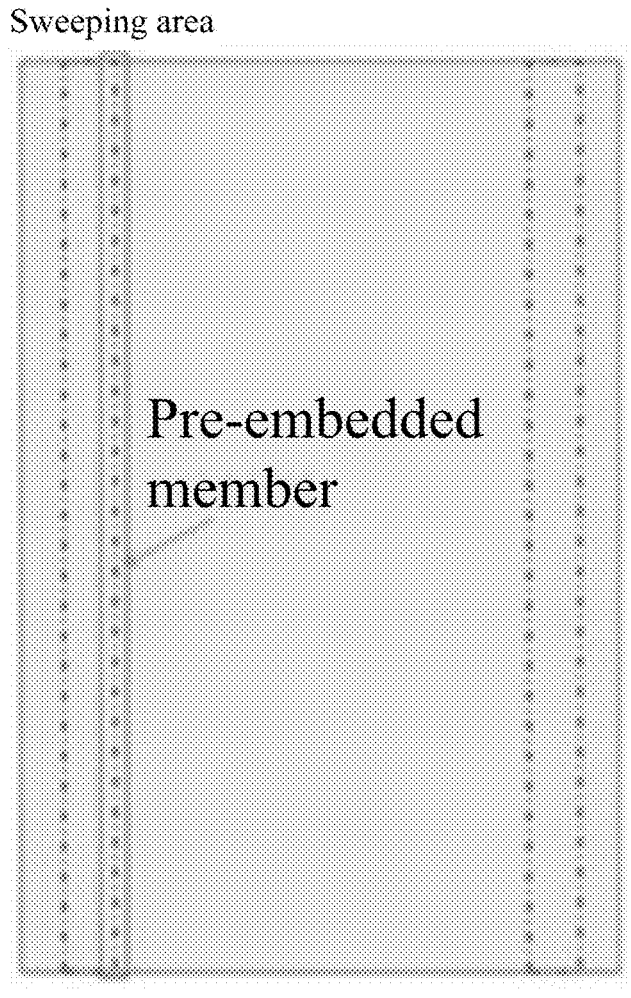
FIG. 2 is a front view of a full-capacity LNG storage tank in a detection process according to the present disclosure.

As shown in FIG. 2, the radial position the same as the pre-embedded member in the storage tank is taken as a sweeping area. The acoustic sensor continuously moves on the outer wall of the storage tank in a step smaller than L, and the acoustic signal is acquired at each step position within a preset period of time less than 1 min. When the acoustic sensor is close to a leakage point of the storage tank, a quantity of acoustic signals acquired per unit time is significantly increased, and a strength is increased. Therefore, the step may be shortened at a position near the leakage point until that the step position at which a largest quantity of acoustic signals are acquired per unit time and a strength of the acoustic signal is strongest is determined, that is, an LNG leakage position is determined.

According to the method for detecting leakage of a full-capacity LNG storage tank by acoustic emission provided in the present disclosure, high-precision non-destructive testing of the LNG leakage can be implemented without opening the storage tank or shutting down a machine.

Each embodiment in the description is described in a progressive mode, each embodiment focuses on differences from other embodiments, and references can be made to each other for the same and similar parts between embodiments.

Particular examples are used herein for illustration of principles and implementation modes of the present disclosure. The descriptions of the above embodiments are merely used for assisting in understanding the method of the present disclosure and its core ideas. In addition, those of ordinary skill in the art can make various modifications in terms of particular implementation modes and the scope of application in accordance with the ideas of the present disclosure. In conclusion, the content of the description shall not be construed as limitations to the present disclosure.

What is claimed is:

1. A method for detecting leakage of a full-capacity liquefied natural gas (LNG) storage tank by acoustic emission, comprising:

suspending a detection surface of an acoustic sensor, detecting an amplitude of system noise by an acoustic emission machine connected to the acoustic sensor, and detecting a signal acquisition threshold;

mounting the acoustic sensor on an outer side of an outer wall of a storage tank, and acquiring an amplitude of ambient noise based on the signal acquisition threshold;

exciting an acoustic signal at a distance of 0.1 m and a distance of x m from the acoustic sensor by an analog sound source, and acquiring, by the acoustic sensor, an amplitude of the acoustic signal excited by the analog sound source at the distance of 0.1 m from the acoustic sensor and an amplitude of the acoustic signal excited by the analog sound source at the distance of x m from the acoustic sensor, wherein x represents a thickness of the outer wall of the storage tank, in m;

calculating, based on the amplitude of the acoustic signal excited by the analog sound source at the distance of 0.1 m from the acoustic sensor and the amplitude of the acoustic signal excited by the analog sound source at the distance of x m from the acoustic sensor, an attenuation coefficient of an acoustic signal passing through the outer wall of the storage tank;

determining a maximum detection range of the acoustic sensor based on the amplitude of the ambient noise and the attenuation coefficient; and continuously moving the acoustic sensor on the outer wall of the storage tank in a step smaller than the maximum detection range, to perform an LNG leakage detection.

2. The method for detecting leakage of a full-capacity LNG storage tank by acoustic emission according to claim 1, wherein the suspending a detection surface of an acoustic sensor, detecting an amplitude of system noise by an acoustic emission machine connected to the acoustic sensor, and detecting a signal acquisition threshold specifically comprises:

suspending the detection surface of the acoustic sensor, acquiring an acoustic signal by the acoustic emission machine connected to the acoustic sensor, and recording a maximum amplitude of the acquired acoustic signal as an amplitude of system noise $m_1$ dB; and setting the signal acquisition threshold to $k_1 = m_1 + 1$ dB.

3. The method for detecting leakage of a full-capacity LNG storage tank by acoustic emission according to claim 2, wherein the mounting the acoustic sensor on an outer side of an outer wall of a storage tank, and acquiring an amplitude of ambient noise based on the signal acquisition threshold specifically comprises:

mounting the acoustic sensor on the outer side of the outer wall of the storage tank, acquiring acoustic signals at least four different positions, and acquiring only an acoustic signal with an amplitude larger than $k_1$; and comparing strengths of the acoustic signals at the positions, and recording a maximum amplitude of an acoustic signal with a same distribution range as the amplitude $m_2$ dB of the ambient noise.

4. The method for detecting leakage of a full-capacity LNG storage tank by acoustic emission according to claim 3, wherein the calculating, based on the amplitude of the acoustic signal excited by the analog sound source at the distance of 0.1 m from the acoustic sensor and the amplitude of the acoustic signal excited by the analog sound source at the distance of x m from the acoustic sensor, an attenuation coefficient of an acoustic signal passing through the outer wall of the storage tank specifically comprises:

calculating, based on an amplitude $m_3$ of the acoustic signal excited by the analog sound source at the distance of 0.1 m from the acoustic sensor and an amplitude $m_4$ of the acoustic signal excited by the analog sound source at the distance of x m from the acoustic sensor, an attenuation coefficient $\alpha$ of the acoustic signal passing through the outer wall of the storage tank according to a formula $\alpha = (m_3 - m_4)/(x - 0.1)$.

5. The method for detecting leakage of a full-capacity LNG storage tank by acoustic emission according to claim 4, wherein the determining a maximum detection range of the acoustic sensor based on the amplitude of the ambient noise and the attenuation coefficient specifically comprises:

determining a maximum detection range L of the acoustic sensor based on an amplitude $m_2$ of the ambient noise and the attenuation coefficient $\alpha$ according to a formula $L = (m_{max} - m_2)/\alpha$, wherein $m_{max}$ represents a maximum amplitude of an acoustic signal of leakage of a lining plate of the storage tank.

6. The method for detecting leakage of a full-capacity LNG storage tank by acoustic emission according to claim 5, wherein the continuously moving the acoustic sensor on the outer wall of the storage tank in a step smaller than the maximum detection range, to perform an LNG leakage detection specifically comprises:

placing the acoustic sensor at a radial position the same as a pre-embedded member in the storage tank, continuously moving the acoustic sensor on the outer wall of the storage tank in a step less than L, and acquiring an acoustic signal at each step position within a preset period of time; and determining a step position at which a largest quantity of acoustic signals are acquired per unit time and a strength of the acoustic signal is strongest as an LNG leakage position.

7. The method for detecting leakage of a full-capacity LNG storage tank by acoustic emission according to claim 1, wherein the acoustic sensor is a piezoelectric acoustic sensor or a fiber-optic acoustic sensor.

8. The method for detecting leakage of a full-capacity LNG storage tank by acoustic emission according to claim 1, wherein the analog sound source is a lead-break signal or a signal excited by an acoustic emission sensor.

* * * * *